UNITED STATES PATENT OFFICE.

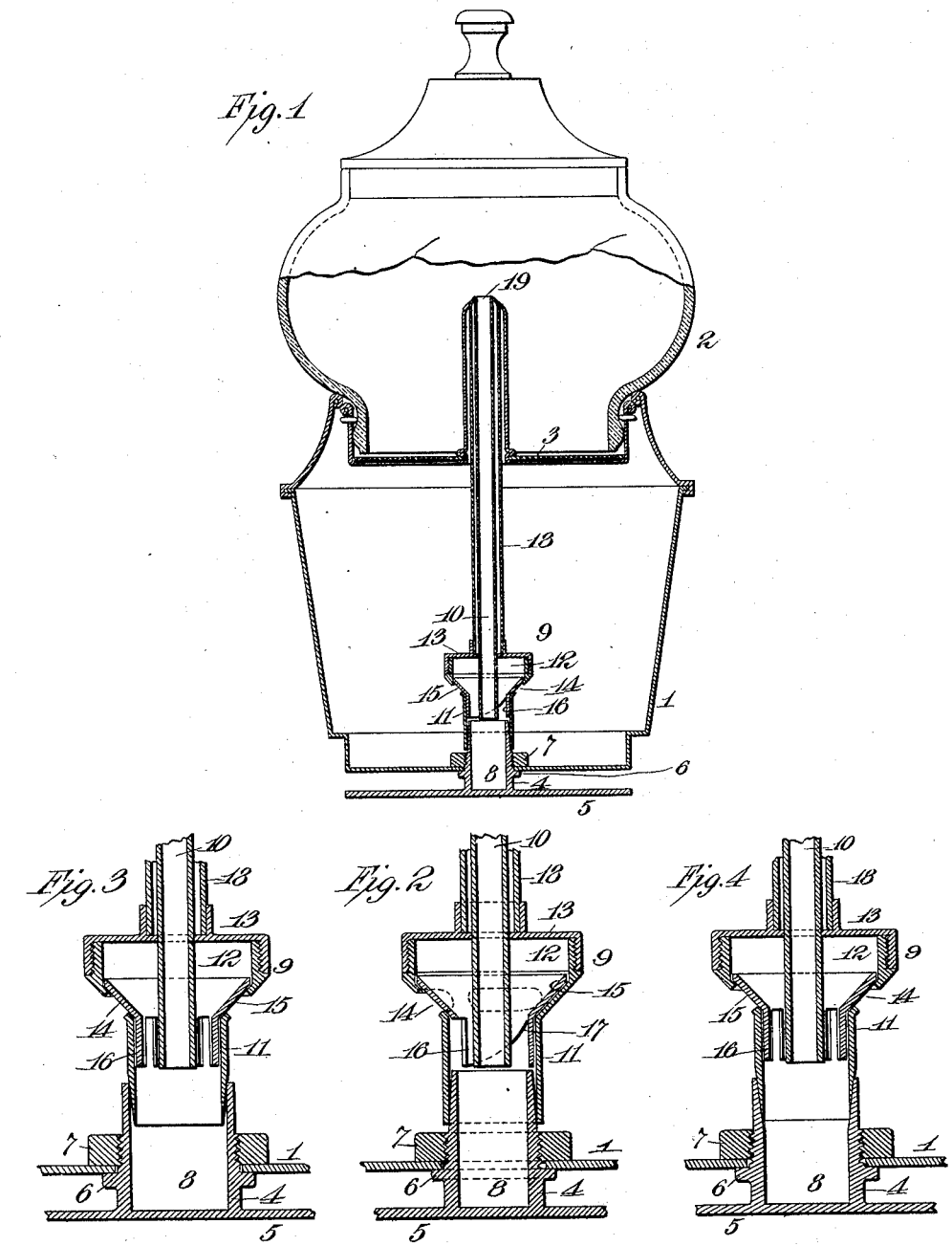

CHARLES NELSON, OF BROOKLYN, NEW YORK, ASSIGNOR TO S. STERNAU & COMPANY, OF NEW YORK, N. Y., A COPARTNERSHIP.

COFFEE-MACHINE.

1,007,725.      Specification of Letters Patent.      Patented Nov. 7, 1911.

Application filed October 15, 1907. Serial No. 397,586.

*To all whom it may concern:*

Be it known that I, CHARLES NELSON, a subject of the King of Sweden, residing in the borough of Brooklyn, county of Kings, and State of New York, have invented an Improvement in Coffee-Machines, (Case I,) of which the following is a specification.

This invention relates to an improvement in machines for making coffee and analogous purposes and particularly relates to improvements upon that type of device illustrated in my co-pending application for patent filed August 4, 1907, Serial No. 389,997.

The objects of the present invention are to increase the efficiency of the device to reduce the time necessary to cause liquid to flow through the fountain, to do away with certain parts of structures heretofore used, and to render the device more easily cleaned.

Other objects will more fully appear from an examination of the following specification and accompanying drawings.

In the drawings, Figure 1 is a vertical section of a portion of a coffee machine embodying my invention. Fig. 2 is a detail section thereof; and Figs. 3 and 4 are detail sections of a modification.

I will describe my present invention as embodied in a machine for making coffee, commonly known as coffee machines, such devices having a receptacle which is supported upon a stand above a spirit lamp, and having a screen or other foraminous support for the coffee, and a transparent globe through which the operation of the fountain can be observed. The invention may be embodied in other structures, such as coffee pots, tea pots and other analogous devices, without departing from the invention.

In the embodiment illustrated in Fig. 1, the receptacle 1 supports the globe 2, which latter in turn carries the foraminous support 3 for the coffee. Through one wall of the receptacle, in the embodiment illustrated—the bottom wall, passes a thimble 4. This thimble is of cylindrical cross section, is hollow, open at the top and closed at the bottom. At the bottom is a flange 5 which is for the purpose of concentrating heat upon the thimble and also for protecting the bottom of the receptacle from heat, except the point where the thimble passes through. In coffee and tea pots the flange serves the additional purpose of a foot for sustaining the device upon the stove. The thimble is secured to the receptacle by the engagement of a small flange 6 with the bottom thereof; the bottom being pinched between the flange and a nut 7, screwed to the thimble inside of the receptacle. The inside of the thimble constitutes a chamber of less capacity than the receptacle 1. This chamber is indicated by the character 8 and communicates with the interior of the receptacle. The fountain 9, in the embodiment illustrated, communicates with the chamber and rests upon and is supported by the thimble. The fountain is shown as comprising an outlet pipe 10, which extends from the chamber 8 up into the globe 2, and an inlet pipe 11, which is outside of and concentric with the inlet pipe, but is of less length than such pipe. The upper portion of the inlet pipe flares outwardly, forming a chamber or box 12; its upper portion is screw-threaded for attachment of the cover 13. This cover is permanently attached to the outlet pipe 10 and serves as a means of connection between the outlet and inlet pipes. By removing the cover 13 from the chamber 12 the inside of the inlet pipe and the outside of the lower portion of the outlet pipe are exposed so that the two latter may be cleaned. That portion of the chamber 12 which flares is provided with a series of openings 14 which serve as a means of communication between the inside of the receptacle and the inlet pipe and the chamber 8. These openings are closed by a valve 15, which is shown as having a dished body so as to snugly rest upon the inner walls of the flaring portion of the chamber 12, and a stem 16, such stem resting within the inlet pipe and being guided by the latter by engagement therewith. The stem 16 is provided with slots so that as the valve is lifted from engagement with the walls of the chamber 12 the slots will be exposed within such chamber and liquid will be free to flow through the openings 14 and slots in the stem 16 into the chamber 8. One of the walls of the slots, as shown in Fig. 2, is inclined upon curved lines at 17. Such inclination produces slots which have inclined sides. The purpose of this arrangement is to allow the opening to progressively increase as the valve is open, and also to produce a relatively long stem on the valve for guiding the latter and at the same time have a sufficiently large slot opening so as not to impede the flow of liquid into the chamber 8.

The inlet tube engages with the thimble 4, either outside of the latter, as shown in Figs. 1 and 2, or inside, as shown in Figs. 3 and 4. One of the engaging surfaces is inclined so that not only a tight fit will be insured between the parts and leakage at that point prevented, but the fountain will be held in position upon the thimble. In the structure shown in Figs. 1 and 2 the inclination is produced by inclining the outer wall of the thimble 4, the engaging inner wall of the inlet tube being not beveled. In the construction shown in Fig. 3, the outer wall of the inlet tube is inclined, and the engaging inner wall of the thimble is not. In the construction shown in Fig. 4 both engaging surfaces are inclined, namely, the inner wall of the thimble and the outer wall of the inlet tube. In the structure shown in Figs. 3 and 4, the slots of the stem of the valve are not inclined but have parallel sides as disclosed in my co-pending application above referred to.

For the purpose of insulating the outlet pipe 10 from the contents of the receptacle 1, I provide a surrounding pipe 18, which extends from the cover 13 up through the foraminous support 3. This surrounding pipe 18 is shown as concentric with the pipe 10, and the space between the two is inclosed, so that liquid cannot enter it. This provides a dead air jacket for the pipe and insulates the latter.

The outlet pipe 10 is straight and of small diameter and is of such a length that it extends for some distance into the chamber 8, its upper open end forming an orifice 19 for the ready ejection of the liquid from the pipe.

The operation of the device is as follows: The receptacle 1 is partly filled with liquid and the requisite amount of coffee is placed within the foraminous support 3. The water will fill the chamber 8, the inlet tube and chamber 12, and will stand in the outlet tube 10 at the same height as in the receptacle 1, or slightly higher, it depends upon capillary action. The valve 15 will rest upon its seat and close the openings 14. Heat is now applied to the flange 5 and chamber 8, rapidly heating the contents of the latter. When the liquid within the chamber 8 boils, the liquid lying within the outlet tube 10 will be forced out of the latter through its open upper end, and will be sprayed upon the contents of the foraminous support 3. The liquid will percolate through such material back into the receptacle 1. As soon as pressure is relieved within the chamber 8, the height of the liquid within the pipe will be lowered and the difference in pressure thereby produced will cause the lifting of the valve from its seat, exposing the openings 14 and permitting the liquid to enter the chamber 8 from the receptacle 1. The contents of the chamber 8 will be again heated and the ejecting action repeated, the operation continuing until a diffusion of the desired strength is produced.

Owing to the absence of an insulating chamber at the base of the fountain, the chamber 8 may be made of small size, and its contents can be brought to a boil in less time than when such chamber is used. Also by using the air jacket on the outlet pipe the contents of the receptacle are kept at a lower temperature, consequently the fountain can raise and discharge liquid for a longer period of time, which lasts until an equilibrium of temperature exists in the device, than is possible in other devices.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. In a coffee machine, the combination with a foraminous essence support, a receptacle having a chamber of smaller capacity communicating therewith, of a fountain in communication with the chamber, an outlet for the fountain, said outlet communicating with the essence support, a closed tube surrounding the outlet and a space between the outlet and tube, forming a dead air jacket between the fountain and the essence support.

2. In a coffee machine, the combination with a foraminous essence support, and a receptacle having a chamber of smaller capacity communicating therewith, of a fountain in communication with the chamber, an outlet pipe for the fountain, a closed tube surrounding the outlet pipe and forming a dead air jacket extending from the fountain to the outlet end of the pipe.

3. A fountain for a coffee machine having an outlet pipe, an inlet pipe, a valve chamber and a valve within the chamber, a closed tube surrounding the outlet pipe, a space between the pipe and tube forming a dead air jacket, the said air jacket extending the entire length of the pipe.

4. A fountain for a coffee machine having an inlet pipe and an outlet pipe, a valve, the said valve having a stem with a slot, one side of the slot being inclined so that as the valve leaves its seat an opening of progressively increasing size will be formed.

This specification signed and witnessed this fourteenth day of October, 1907.

CHARLES NELSON.

Witnesses:
LEONARD H. DYER,
JOHN C. LOTSCH.

Copies of this patent may be obtained for five cents each, by addressing the "Commissioner of Patents, Washington, D. C."